Feb. 19, 1952
E. T. WHITE, JR
TRUCK GRAIN BODY
2,586,279
Filed April 10, 1950
2 SHEETS—SHEET 1
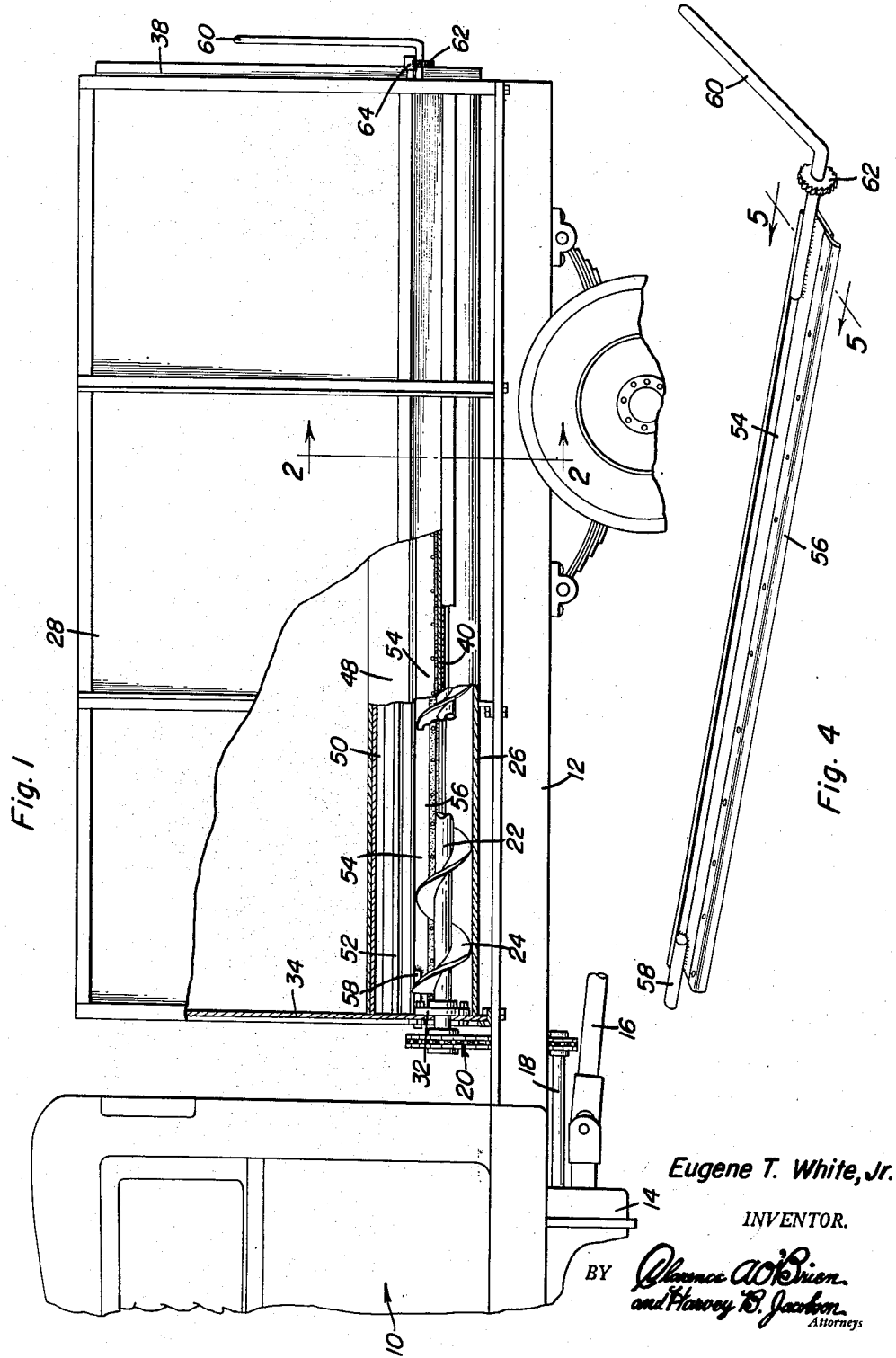
Eugene T. White, Jr.
INVENTOR.
BY *Clarence A.O'Brien*
*and Harvey B. Jackson*
Attorneys Feb. 19, 1952     E. T. WHITE, JR     2,586,279
TRUCK GRAIN BODY
Filed April 10, 1950     2 SHEETS—SHEET 2
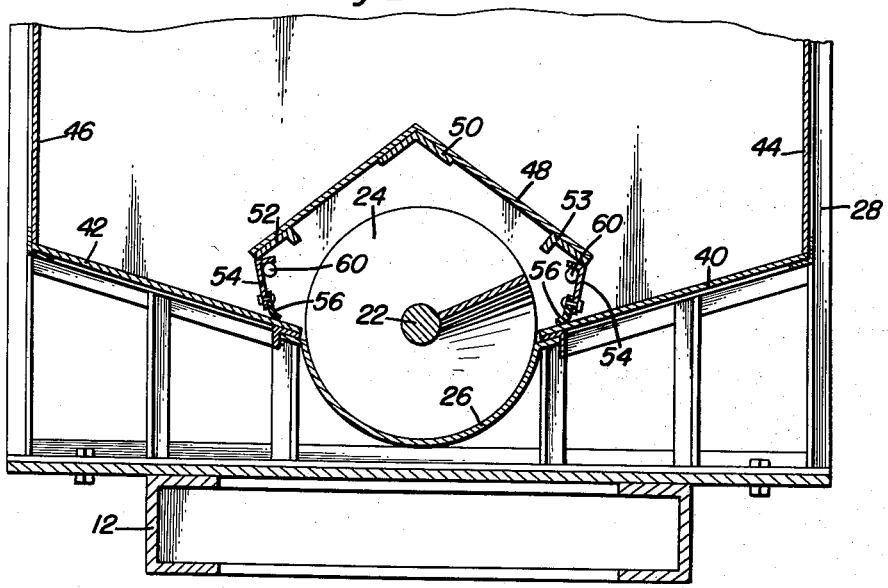
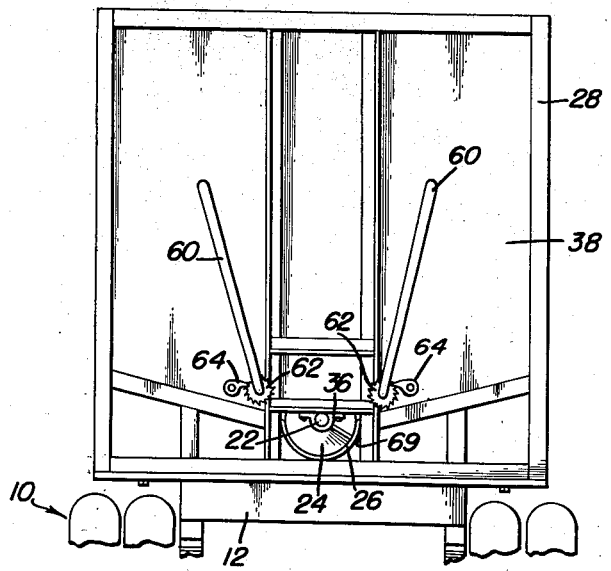
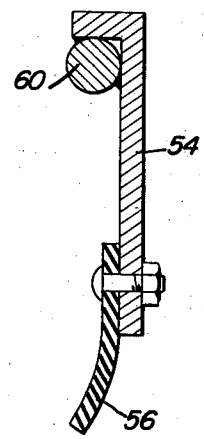
Eugene T. White, Jr.
INVENTOR.

Patented Feb. 19, 1952

2,586,279

UNITED STATES PATENT OFFICE 2,586,279

TRUCK GRAIN BODY

Eugene T. White, Jr., Northwest, Va.

Application April 10, 1950, Serial No. 154,996

3 Claims. (Cl. 214—83.32)

This invention relates to improvements in vehicles and specifically the body for trucks.

An object of this invention is to provide an improved truck body by virtue of the structural arrangement therein which allows grain to be discharged from the body at a predetermined rate by an improved mechanism.

Another object of this invention is to provide an improved valve mechanism which is adapted for the specific purpose of operating in connection with the improved vehicle body, allowing only a certain amount of grain to be discharged into an endless conveyor for subsequent emission through the rear door opening in the truck body; and which closes the passageway connecting the auger chamber and the grain storage chamber in the truck body.

Other objects will become aparent in following the description of the illustrated form of the invention.

In the drawings:

Figure 1 is a side view of a part of a truck, portions being broken away in section to illustrate internal details;

Figure 2 is a view in an enlarged scale and taken substantially on the line 2—2 of Figure 1 and in the direction of the arrows;

Figure 3 is an end view of the device in Figure 1;

Figure 4 is a perspective view of one of the valves employed in the invention and forming a part thereof; and Figure 5 is a transverse sectional view taken substantially on the line 5—5 of Figure 4 and in the direction of the arrows.

Briefly summarized, the novelty to be hereinafter asserted has to do with a grain truck body having its lower portion hopper-shaped and characterized by a pair of spaced parallel, downwardly diverging panels. The inner spaced edges are joined by way of a semi-circular or equivalent web defining an open-ended trough in which the rotatable feed or conveyor screw is mounted. There is an inverted, V-shaped hood and this spans the trough and screw and is fixedly supported so that its lower edge portions define grain inlets feeding into the trough and gate valves are provided for controlling these openings, the valves being controllable from the exterior of the truck body.

In carrying out the invention, a truck generally indicated at 10 is provided with the usual appurtenances contiguous to the truck, as the chassis 12, transmission case 14 with the drive shaft 16 extending therefrom. An auxiliary shaft 18 extends from the transmission and has a sprocket-chain drive 20 extending therefrom. One of the sprockets of the assembly is secured to the auger shaft 22, the auger blade 24 cooperating therewith to form a conveyor.

The auger type conveyor or screw is disposed in a longitudinal trough 26 which is disposed at the bottom of the truck body 28. The so-called truck body 28 may be a housing bolted or otherwised fixed to a flat or stake bodied vehicle or may be original truck equipment. The former is preferable whereby the device may be considered an attachment to be used as a standard stake bodied or flat body truck. The front end of the auger shaft is carried in a bearing 32 which is mounted on the front end 34 of the vehicle body and in a bearing 36 carried by the rear end 38 of the truck body.

Base panels 40 and 42 are disposed in the vehicle body 28 and slope downwardly toward the trough 26. Vertical panels 44 and 46 line the inner walls of the truck body 28 and are affixed thereto by any suitable means. The panels 44 and 46 may be omitted if found desirable and the actual walls of the body 28 may be employed in lieu thereof.

A hood 48 with a longitudinal angle iron bracing 50 supporting the same is disposed over the auger; the angle iron bracing 50 being fixed, as by welding, to the ends 34 and 38 of the vehicle body.

Longitudinal stringers in the form of angle iron members 52 and 53 are provided at the lower edges of the hood 48, said edges being spaced vertically from the panels 40 and 42, respectively, in order to define passageways for the grain which is stored on the panels 40 and 42. Mounted in each passageway is a valve, one of which is illustrated in detail in Figure 4.

This valve consists of a gate panel 54 which is substantially L-shaped, consisting of a short leg and a long leg. At the lower edge of the long leg there is a flexible flap 56, as a strip of rubber or the like. It is held in place by means of rivets, screws, or the like. At the junction of the long and short legs and at one end of the panel 54 there is a trunnion 58 which is welded or otherwise rigidly fixed. This trunnion is mounted in a bearing which is carried by the end 34 of the vehicle body. At the other end of the panel 54 and at the junction of the short and long legs, there is a suitably journaled crank 60, one end of which is held in place on the gate panel as by welding. A ratchet 62 is secured thereto and is adapted to be engaged by the pawl 64 which is pivotally mounted on the end 38 of the vehicle body (Figure 3). The other end of the crank 60 is arranged on the exterior of the vehicle body for manual operation thereof.

In operation, the vehicle body is loaded. The grain is deposited on the panels 40 and 42 and engages the panels 44 and 46. When it is desired to discharge some of the grain, the conveyor screw is set into motion and the valves opened. By opening the gate valves, the passageways are accordingly opened, allowing some of the grain to be discharged by the forces of gravity into the trough 26. Inasmuch as the conveyor screw is in operation, the grain will be conveyed outwardly through the door opening 69 at the lower part of the rear of the end 38 of the vehicle.

Having described the invention, what is claimed as new is:

1. In a structure of the class described, in combination, a truck body for transporting and dispensing granular materials, said body having a hopper-shaped bottom embodying a pair of spaced parallel inwardly and downwardly inclined panels with their longitudinal edges spaced apart, a semi-circular plate connected to and joining with the edge portions of the panels in defining a trough, said trough being open at at least one end for discharging grain, an inverted V-shaped hood supported in said body directly above and spanning said trough and screw, said hood having outwardly and downwardly diverging wall portions with their edges spaced above said panels and defining intake openings, gate valves mounted for oscillation in and normally closing said openings, and manually regulable means for opening and closing said valves.

2. The structure specified in claim 1 wherein said means embodies exteriorly disposed accessible cranks and individual pawl and ratchet mechanisms for the respective cranks.

3. In a structure of the class described, a truck body embodying interconnected side and end walls and a trough-shaped bottom coacting with said walls, said bottom embodying a pair of inwardly and downwardly inclined gravitating panels, said panels having longitudinal edge portions spaced apart in parallelism, a semi-circular plate connected to said edge portions and cooperating therewith in defining a grain receiving, collecting and dispensing trough, a conveyor screw mounted for rotation in said trough, a plurality of spaced parallel longitudinal stringers fixedly supported between the end walls and in positions elevated above said trough and panels, an inverted V-shaped plate attached to and supported by way of said stringers and overlying said trough and constituting a hood, said plate having outwardly and downwardly disposed longitudinal edge portions spaced above coacting surfaces of the underlying panels, gate valves including flap members and having journals mounted for oscillation in bearings provided therefor in the end walls of said truck body, said valves being situated in the respective spaces between the hood and panels, and having operating cranks located on the exterior of one end wall of the truck body, and pawl and ratchet mechanism for coaction with said cranks.

EUGENE T. WHITE, Jr.

REFERENCES CITED

The following references are of record in the file of this patent:

UNITED STATES PATENTS

| Number | Name | Date |
| --- | --- | --- |
| 802,698 | Kern | Oct. 24, 1905 |
| 2,345,328 | Conway et al. | Mar. 28, 1944 |
| 2,438,301 | Schulte | Mar. 23, 1948 |
| 2,439,541 | Hall | Apr. 13, 1948 |
| 2,466,923 | Woodard | Apr. 12, 1949 |
| 2,470,836 | Piper | May 24, 1949 |
| 2,517,151 | Weston | Aug. 1, 1950 |